Aug. 6, 1968 J. R. WINEGARD 3,396,399

ULTRA-HIGH FREQUENCY FISHBONE TYPE TELEVISION ANTENNA

Filed March 24, 1965 3 Sheets-Sheet 1

Inventor
John R. Winegard
By Frost, Burmeister & Kulie
Attorneys

Inventor
John R. Winegard
By Frost, Burmeister & Kulie
Attorneys

Aug. 6, 1968 J. R. WINEGARD 3,396,399
ULTRA-HIGH FREQUENCY FISHBONE TYPE TELEVISION ANTENNA
Filed March 24, 1965 3 Sheets-Sheet 3
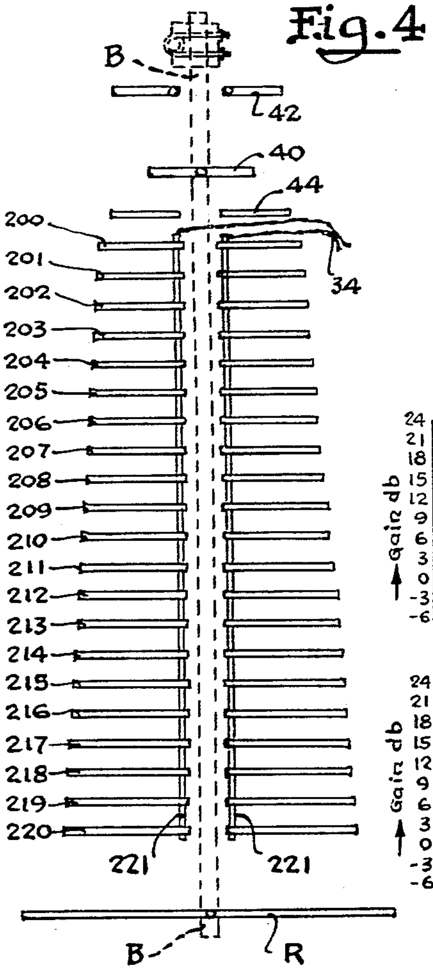
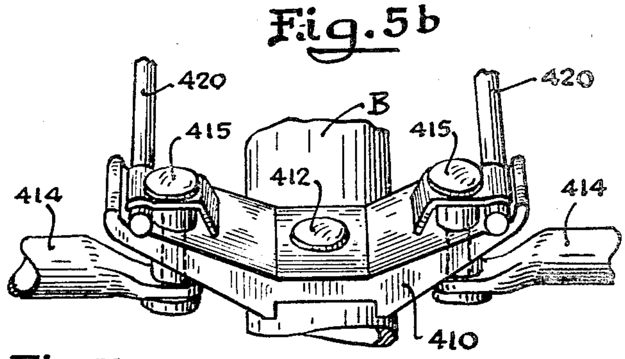
Fig. 7
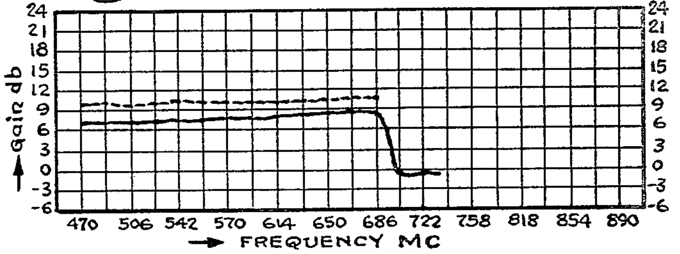
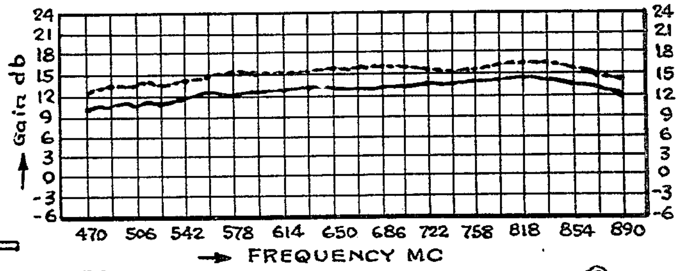
Fig. 8
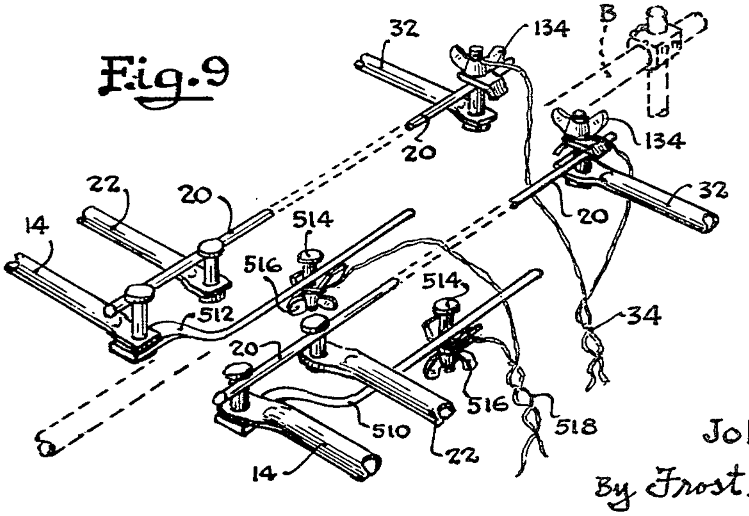
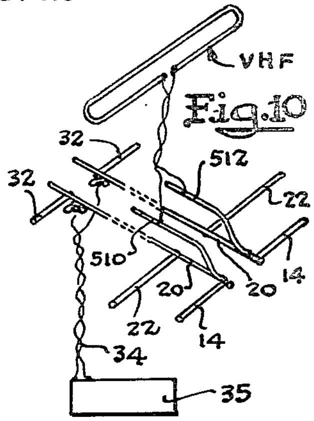
Inventor
John R. Winegard
By Frost, Burmeister & Kulie
Attorneys United States Patent Office 3,396,399

Patented Aug. 6, 1968

3,396,399
ULTRA-HIGH FREQUENCY FISHBONE TYPE TELEVISION ANTENNA

John R. Winegard, Burlington, Iowa, assignor to The Winegard Company, Burlington, Iowa, a corporation of Illinois Filed Mar. 24, 1965, Ser. No. 442,289
9 Claims. (Cl. 343—811)

ABSTRACT OF THE DISCLOSURE

An improved antenna structure especially suited for coverage of the ultra-high frequency television band wherein a plurality of full wave resonant dipole elements are utilized in a closed spaced, coplanar array to provide substantially uniform impedance and high gain across the entire operating range of frequencies.

This invention relates to an ultra-high frequency television receiving antenna characterized by relatively high gain, wide bandwidth, and a yagi type construction with the resultant advantages, and suitable for use in conjunction with a very high frequency television antenna.

Television channels 14 to 83, inclusive, occupy the frequency band from 470 to 890 megacycles. These correspond to wavelengths of about 10 inches to about 18.5 inches. Because of the short wavelengths and high frequencies involved in these so-called ultra-high frequency channels, there is a considerable loss as the signals pass from the transmitter antenna to a relatively high antenna gain. In an all-channel antenna, this means that the antenna must have this relatively good gain over the entire frequency spectrum. Additionally, the antenna must have a reasonable close impedance match with conventional 300 ohm twin lead transmission line and reasonable directivity.

Heretofore, television antennas have used approximately half wave dipole or folded dipole driven elements. In the very high frequency range—up to about 220 megacycles—these elements are of size to present a favorable capture area and hence provide reasonable gain, directivity, and practicality. The theoretical impedance of the folded dipole is 288 ohms, which matches the 300 ohm twin lead. Open dipole constructions, having a theoretical 72 ohm impedance, can readily be matched through the use of various forms of resonant coupling elements, T-matched configurations, and the like. This has been possible because the impedances to be matched do not vary greatly and thus can be accomodated by simple and effective structures.

For television receiver usage, antennas of the above types have proved less than adequate, particularly in the ultra high frequency range of 470 to 890 megacycles. The common "bow-tie" constructions usually have driven elements of full-wave dimensions. However, they must be stacked to provide acceptable gain. Stacking makes the resultant array frequency sensitive so that while a tolerable gain may be effected in part of the UHF band, relatively poor gain is encountered over the remainder of the band. The same narrow band gain problem is also encountered with respect to simple antennas of the so-called yagi construction. That is, while they may be constructed to have good directivity, relatively compact size and comparative mechanical simplicity, acceptable gain is confined to a few channels. The log-periodic antenna construction is subject to the disadvantage that only two or three of the driven elements operate effectively at any given frequency and the remainder are either inactive or prejudice performance. Parabolic antennas having sufficient gain over the entire UHF band are possible, but are not usually practical, due to size, weight, wind resistance and cost considerations.

The present invention utilizes a plurality of full wave dipoles in an ultra high frequency television receiving antenna. Surprisingly, it has been found that when a plurality of such dipoles of varying length between a short dipole tuned to the high frequency end of the band and a long dipole tuned to the low frequency end of the band are used in close spaced relation in accoradnce with the present invention, a highly effective antenna of about 300 ohms impedance is provided. In accordance with one preferred embodiment of the invention as described herein, the dipoles are spaced along the length of the boom by about 2 inches and seven such dipoles are used. Using seven dipoles as in one specific construction herein described, for example, it is possible to obtain about 8 db gain that is practically uniform over the entire frequency range from 470 to 890 megacycles and a good impedance match to the twin lead.

The antenna of the present invention is further characterized by a suitability for use in conjunction with a VHF antenna, that is, an antenna for channels 2–13. In particular, the antenna of the present invention may form a part of the transmission line from the VHF antenna to the receiver.

It is therefore a general object of the present invention to provide an improved ultra high frequency television receiving antenna capable of providing high gain reception throughout the 470–890 megacycle frequency range using a simple, light weight, and low wind resistance yagi construction.

A more particular object of the present invention is to provide an ultra high frequency television receiving antenna capable of providing high gain reception throughout the 470–890 megacycle frequency range with a good impedance match to 300 ohm twin lead while at the same time utilizing full wave dipole driven elements.

Still another object of the present invention is to provide an improved ultra high frequency television receiving antenna which may utilize varying numbers of driven elements ranging from at least three to 20 or more without any fundamental change in the construction and with increased gain in general accordance with the number of driven elements used.

Further it is an object of the present invention to provide an improved ultra high frequency television receiving antenna utilizing features of construction, combination and arrangement wherein a simple, effective, and readily manufactured antenna is provided, to the end that a product of maximum commercial usefulness is achieved.

Yet another object of the present invention is to provide an ultra high frequency antenna that is particularly suited for use in conjunction with a very high frequency antenna.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawings, in which:

FIGURE 1 is a view in perspective of the antenna of the present invention in its preferred form;

FIGURE 1*a* is an enlarged fragmentary view of the flattened end of a director as used in the structure of FIGURE 1;

FIGURES 3 and 4 are views similar to FIGURE 2 but showing antennas having three driven elements and 21 driven elements, respectively;

FIGURE 5b is a view like FIGURE 5 but showing an alternative construction of the apparatus shown therein;

Figures 1, 1A, 5, 5A:
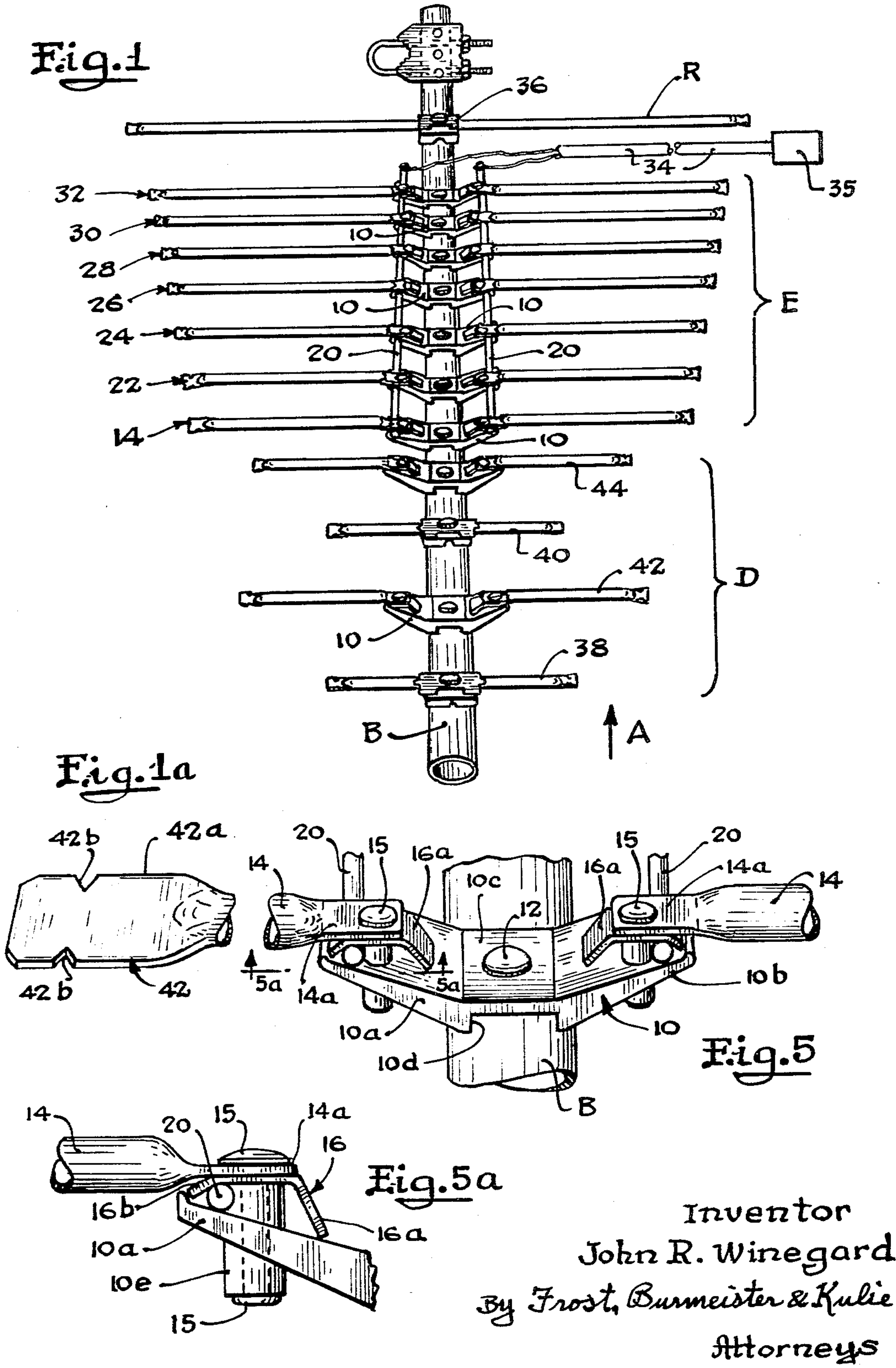
FIGURE 5 is a fragmentary enlarged view in perspective of the mounting arrangement for each dipole element of the antenna of FIGURE 1.
FIGURE 5a is an enlarged cross-sectional view taken along axis 5a—5a, FIGURE 1.
Figure 2:
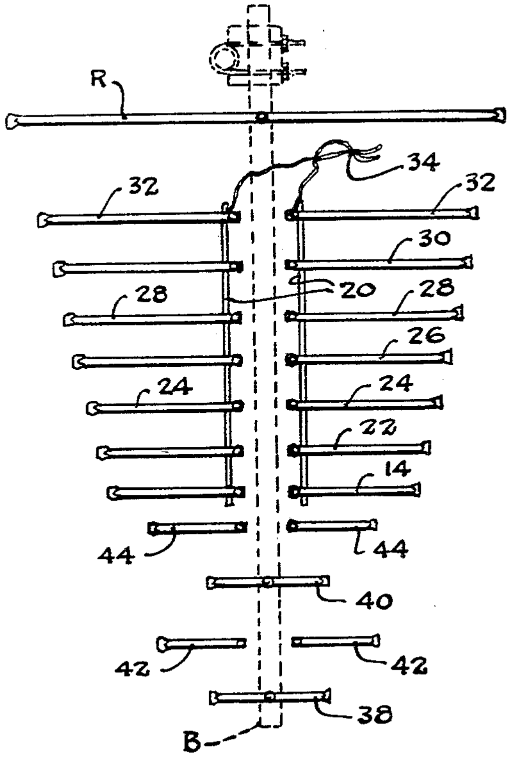
FIGURE 2 is a top plan view in somewhat diagrammatic form showing the principal electrically effective elements of the antenna of FIGURE 1.
Figure 3:
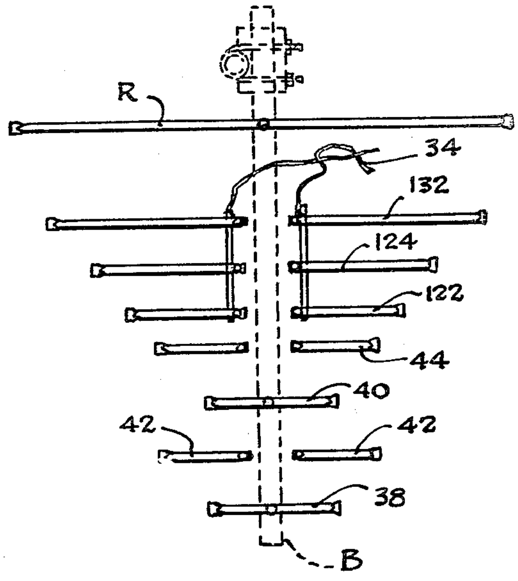
Figure 6:
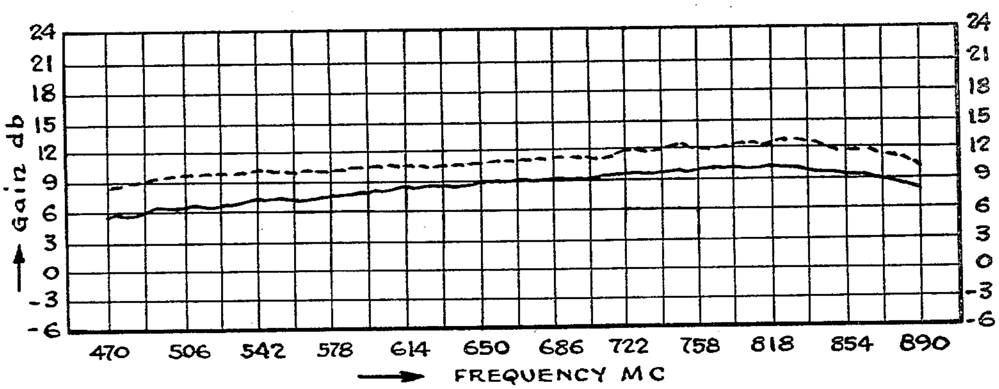

FIGURES 6–8, inclusive, are charts showing the gain of the antennas of FIGURES 2–4, respectively, the solid line in each instance showing the single antenna and the dotted line showing a pair of vertically stacked antennas;

FIGURE 9 is a fragmentary view in somewhat diagrammatic form of a modified form of the antenna of FIGURE 1, and;

FIGURE 10 is a somewhat diagrammatic view of a complete receiving system employing the antenna of the present invention in coaction with a very high frequency antenna.

Referring now to FIGURE 1, the antenna is composed of a boom B, which is mounted by appropriate means (not shown) to a mast or other support in a position pointed in the direction from which the signals come. The direction of incoming signals is indicated by the arrow A. At the forward end of the antenna unit there is provided a director unit D, described in further detail hereafter. Behind the director unit D there is provided a set of seven driven elements, indicated at E. At the rear of the antenna, a reflector R is provided. All of these elements are composed of conducting rods, preferably of aluminum, which are located in a common plane through the boom B. Additionally, they are in centered relation to the boom B and aligned in relation to each other, as shown.

The driven elements, indicated at E, are mounted on the boom B by a series of insulating saddles 10. One such saddle is shown in enlarged perspective view in FIGURE 5. It is preferably made of molded polyethylene, polypropylene, or similar low loss plastic material. Each saddle 10 has a pair of outwardly and upwardly extending wings **10*a* and 10*b* and an intermediate flat face 10*c*. Below the face 10*c*, there is a bottom groove of a generally rectangular cross-section as indicated at 10*d*. The groove 10*d* defines a flat face beneath face 10*c* which rests on the top of the boom B, and a pair of spaced side surfaces at the margins of groove 10*d* that rest on the boom B. The rivet 12 extends through the face 10*c* of the saddle and the boom to hold the saddle in fixed position on the boom, with the surfaces defined by the groove 10*d*** bearing against the boom and holding the saddle against rotation.

The dipole arms, indicated at 14, FIGURES 5 and 5*a*, are secured to the saddle by the rivets 15. As seen best in FIGURE 5*a*, each such rivet extends through a vertical sleeve portion **10*e* in the saddle. The sleeve portion 10*e* terminates at its upper end in a flat horizontal face against which the spring clip 16 is seated as shown. The clip 16 has a depending wing 16*a* which extends downwardly into engagement with the upper face of the wing 10*a* of the saddle 10. The flat inboard end portion 14*a* of the driven element 14 seats on the flat upper portion of the clip 16, as shown. A rivet 15 extends through the sleeve part 10*e* to hold the flat 14*a* of the dipole arm 14 and the clip 16 in sandwiched relation to each other, thus defining an electrical connection and holding the dipole arm 14 in position. At the end opposite the wing 16*a*, the clip 16 has a slightly downturned end 16*b*. This end overlays the transmission line conductor 20 and bears against the same under the action of the rivet 15, thus holding the conductor 20 in place and making a good electrical connection thereto. For storage or shipment, the dipole arms 14**, FIGURES 5 and 5*a*, may be swung against the spring action of the clip 16 to positions generally parallel to the boom B. The above, of course, in only one specific mechanical structure for illustration purposes.

It will be understood that the above support construction is utilized on each of the driven elements 14, 22, 24, 26, 28, 30 and 32, FIGURE 1.

The driven element 14 of FIGURE 1 is the forward driven element and is tuned for maximum response at the high frequency end of the band, that is, near 890 megacycles. In the specific preferred form of the antenna shown in FIGURE 1, the span of this element is about 14.25 inches and each of the arms is about 6.25 inches in length. This provides a full wave resonant frequency of about 940 megacycles. Since the adjacent elements have an effect on the actual resonant frequency of this element, the actual length and the electrical length are not exactly the same.

The rear driven element 32 is the lowest frequency driven element. In the specific preferred form of the antenna shown in FIGURE 1, the span of this element is about 19.25 inches and each of the arms is about 8.75 inches in length. These dimensions provide a full wave resonant frequency of slightly lower than 470 megacycles. Since the other adjacent elements have an effect on the resonant frequency of this element, the actual length and the electrical length are not the same.

In accordance with the present invention, the intermediate driven elements 22, 24, 26, 28 and 30 are of progressively varying lengths between the relatively short front element 14 and the relatively long rear element 32. In the specific preferred form of the antenna shown, these elements are spaced from each of the adjacent elements by 2 inches, thus providing about three such elements per half wavelength at the high frequency end of the band. The lengths of these elements in the preferred form of the invention illustrated in FIGURE 1 are substantially as follows:

| Element | Span, inches | Arm Length, inches |
|---|---|---|
| 14 | 14.25 | 6.25 |
| 22 | 14.75 | 6.5 |
| 24 | 15.75 | 7.1 |
| 26 | 16.1 | 7.25 |
| 28 | 17.25 | 7.7 |
| 30 | 18.25 | 8.25 |
| 32 | 19.25 | 8.75 |

The transmission line conductors 20 are preferably of solid aluminum rod of about 0.375" diameter. They extend parallel to each other and to the boom B as shown in FIGURE 1. In the specific construction as shown in FIGURES 1 and 2, they are spaced about 2.5" center to center. As will be evident from FIGURES 5 and 5*a*, and the above description with reference to these specific figures, these rods are in electrical connecting relation to the inboard ends of the respective dipole arms. The result is a plurality of driven elements in end-fire array connection in like sense to the common transmission line.

The twin lead 34, FIGURE 1, extends to the receiving set indicated diagrammatically at 35. The line 34 is conventional 300 ohm television twin lead and the receiver is of conventional construction with a 300 ohm input circuit. As shown, the separate wires of the twin lead (which serve as terminal conductors for the receiving system defined by twin lead 34 and receiver 35) are connected to the inboard ends of the long dipole 32 and thence to the conductors 20—20. The rivets 15, FIGURES 5 and 5*a*, are replaced by suitable bolts and nuts on the rear element 32 to provide ready means of connecting the conductor twin lead 34.

The reflector R is a length of conductor, preferably aluminum rod, of a length (such as 22 inches) to provide reflector action at the low frequency shown. A suitable bracket, indicated generally at 36, FIGURE 1, is provided to mount the reflector R in position on the boom B. This bracket may permit the reflector R to swing about the boom B for storage or shipment of the antenna.

The director unit D, FIGURE 1, is designed to provide its principal action at the high frequency end of the band. It consists of a pair of spaced unitary directors 38 and 40 and a pair of spaced dipole directors 42 and 44. The latter are interposed between directors 38 and 40 and between director 40 and driven element 14, respectively. The unitary directors are about 5.5 inches in length. Each arm of the dipole directors are mounted on saddle brackets similar to bracket 10, FIGURES 5 and 5*a*. Of course, the conductors 20 are not connected to these dipole directors.

The antenna is preferrably formed of aluminum rod or tubing. The phasing lines and the driven elements can be stamped from a metal plate in one or more sections or cast from metal plastic that has been plated with a metallic conductor. In one specific construction found satisfactory, the arms of the directors, driven elements, and the reflector were formed from 0.375" O.D. aluminum tubing with the boom formed from one inch O.D. aluminum tubing.

FIGURE 6 is an illustrative response curve for the antenna of FIGURES 1 and 2. While the data for a curve of this sort can never be precise (due to the effects of unwanted reflections and other error-producing factors), the curve does show a relatively uniform response over the full 470 to 890 megacycle frequency band. The solid line represents the gain of a single antenna while the dotted line represents the gain of a pair of vertically stacked antennas of the structure shown in FIGURES 1 and 2. The average antenna gain is about 8 db over a 300 ohm folded dipole cut to specific frequencies in the ultra high frequency band. It has been further found that the directivity of the antenna throughout the 470 to 890 megacycle range is rather uniform and neither too sharp nor too broad for usual television receiving use.

The essential electrical construction of the antenna of FIGURE 1 will be apparent from FIGURE 2. It will be noted that the driven elements form a bonelike conformation of arms extending outwardly from the transmission line conductors 20 and in directions normal thereto. Also it will be noted that the lengths of these arms vary rather uniformly from the shortest arms (dipole 14) to the longest arms (dipole 32). Despite the fact that the respective dipole arms are approximately one-half wave in length at their effective resonant frequencies, (thus giving full wave dipole action), it has been found that with three or more such elements a relatively good impedance match to 300 ohm twin lead is provided.

FIGURE 3 shows the principal electrical components of a modified form of the antenna of FIGURES 1, 2 and 6. In this antenna, three full wave dipole driven elements are used, as indicated at 122, 124 and 132. The dimensions of these dipoles in this antenna in its preferred form are:

| Element | Span, Inches | Arm Length, Inches |
|---|---|---|
| 122 | 12.25 | 5.25 |
| 124 | 15.25 | 6.75 |
| 132 | 18.25 | 8.25 |

The gain of this antenna over the 470 to 890 megacycle frequency range is shown in FIGURE 7 where the solid line represents the gain of a single such antenna while the dotted line repreesents the gain of two such antennas in a vertically stacked relation. It will be evident that the gain of this antenna is somewhat less favorable than that of the antenna of FIGURES 1 and 2 and is somewhat less uniform. The gain is of sufficient amount as is sufficiently uniform, however, to provide effective reception in many applications. The spacing of the elements 122, 124 and 132 along the boom is preferably about 1.75 inches and in any event is more than about 1.5 inches and less than about three inches.

The director system of the antenna of FIGURE 3 includes a dipole director 44, a unitary director 40, a dipole director 42, and a unitary director 38, spaced and located as shown. These are of substantially the length of the correspondingly numbered directors of the antenna of FIGURES 1 and 2. The reflector of the antenna of FIGURE 3 is like the reflector R of the antenna of FIGURE 2.

FIGURE 4 is a somewhat diagrammatic view like FIGURES 2 and 3 but of a 21 element antenna constructed in accordance with the present invention. In this antenna, the directors 44, 40 and 42, the boom B (except as to length) and the reflector R are like those of the antenna of FIGURE 2. The driven elements of the antenna of FIGURE 4, which are 21 in number, are indicated by the reference numerals 200 to 220 inclusive. These are spaced approximately 1.75 inches along the length of the boom B and in the specific form of the antenna shown have substantially the following lengths:

| Element | Span, Inches | Arm Length, Inches |
|---|---|---|
| 200 | 11.75 | 5.0 |
| 201 | 12.25 | 5.25 |
| 202 | 12.75 | 5.5 |
| 203 | 13.25 | 5.75 |
| 204 | 13.25 | 5.75 |
| 205 | 13.75 | 6.0 |
| 206 | 13.75 | 6.0 |
| 207 | 14.25 | 6.25 |
| 208 | 14.25 | 6.25 |
| 209 | 14.75 | 6.5 |
| 210 | 14.75 | 6.5 |
| 211 | 15.25 | 6.75 |
| 212 | 15.25 | 6.75 |
| 213 | 15.75 | 7.0 |
| 214 | 15.75 | 7.0 |
| 215 | 16.25 | 7.25 |
| 216 | 16.25 | 7.25 |
| 217 | 16.75 | 7.5 |
| 218 | 17.25 | 7.75 |
| 219 | 17.25 | 7.75 |

It has been found that the antenna of the present invention provides an impedance that substantially matches the 300 ohm input impedance of the twin lead 34, which is connected to a conventional 300 ohm input television receiver 35. This has been found to be true whether the number of driven elements is small, say, three, or large, say, twenty. It has been found true even though the full wave dipole elements in theory have very high impedances. It is not known just why this impedance matching effect occurs. It appears to be the consequence of the interaction between each dipole and the other dipoles of the series, particularly, those adjacent to it. The fact that performance is considerably degraded when the dipoles are spaced more than about 2 inches, and especially with spacings of over 3 inches, suggests that such interaction is responsible for the performance. In any event, the unit acts over the frequency range as if it were a single full wave driven element having about 300 ohms impedance, giving in combination the gain of a full wave as distinguished from a half wave element, the impedance of a folded half wave element, and performance in each individual channel as if the antenna were cut specifically to the length for that channel.

The gain of the antenna of FIGURE 4 is shown in FIGURE 8. Again, the solid line represents the gain of a single such antenna while the dotted line represents the gain obtained when two such antennas are vertically stacked. It will be seen that the gain is relatively uniform over the entire UHF band and is somewhat more than the gain of the antennas of FIGURES 1 and 3.

The driven elements should progressively increase in length along the boom B. A substantially linear or uniform variation is generally effective. In any instance, however, trimming of individual elements on a cut and try basis is desirable if maximum uniformity of gain is to be achieved.

At the low frequency end of the range, the gain can be substantially enhanced by use of the reflector R, FIGURE 1. This reflector is made slightly longer than resonant length at the low end of the band and is spaced from the rear driven element (32, FIGURE 1) to provide the most effective reflector action. It is believed that at intermediate frequencies in the band and at the high frequency end of the band the respective driven elements act as reflectors and thereby contribute to the gain of the particular dipoles that provide maximum performance.

The director D, FIGURE 1, enhances the performance at the high frequency end of the band. In the preferred form of the director as shown in FIGURE 1, the centered unitary director elements 38 and 40 provide director action in alignment and in centered relation to the boom B, whereas the dipole director elements 42 and 44 provide director action in general alignment with the separate elements of the dipole driven elements (particularly 14 and 22, which are tuned at or near the high frequency end of the range). It has been found that this particular director arrangement is especially effective, although other director arrangements can be used.

The conductors 221 extend in the direction of the length of the boom B of the antenna of FIGURE 4 and straddle the same as indicated. These are connected to the respective inboard ends of the driven elements 200 to 220, inclusive.

The transmission line to the television receiver is indicated at 34 in FIGURES 2 and 3. It will be noted that in the antenna of FIGURE 3 the transmission line 34 is connected to the rear-most driven element 132. In the antenna of FIGURE 4, it is connected to the forward driven element 200.

FIGURE 5*b* is like FIGURE 5 but shows an alternative mounting construction for the driven element and related apparatus. Parts corresponding to those of FIGURE 5 are indicated by like reference numerals with the number 400 added.

In addition to serving as an efficient and effective driven element for the ultra high frequency television channels, the driven element constructions of the antenna of the present invention are characterized by a transmission-line-like action that affords a particularly convenient way to interconnect the same with a very high frequency (VHF) television antenna. FIGURE 9 shows a preferred arrangement for this purpose. As shown, the forward driven element 14 (in the specific case of the antenna of FIGURES 1 and 2), receives at its inboard ends the two additional transmission line conductors 510 and 512. As shown, these preferably extend downwardly and then horizontally in parallel relation. In a specific antenna construction these were, for example, solid aluminum about $\frac{5}{16}$ inch in diameter and each about 7 inches long. A pair of clamp connectors 514 are affixed to these conductors 510 and 512, respectively, and define depending binding posts located about 4 inches from element 14, upon which the thumb nuts 516 are received. An insulator (not shown) serves to support the binding posts from the boom and thereby the conductors 510 and 512. These binding posts receive the respective conductors of the twin lead 518, which extends to the connected very high frequency (VHF) antenna. As shown also in FIGURE 9, the antenna defines binding posts 134 at its rear driven element (as in the antenna of FIGURE 1) which receive the transmission line 34 extending to the television receiver (35, FIGURE 10).

The complete UHF and VHF receiving system of FIGURE 9 is shown diagrammatically in FIGURE 10. The UHF antenna is shown in inverted position in relation to the showing of FIGURE 9. In the UHF channels, the receiver is connected to the UHF antenna (such as that specifically shown in FIGURE 1). In this frequency range, the VHF antenna, indicated diagrammatically at VHF, FIGURE 10, is connected to the forward end of the UHF frequency antenna through the action of the conductors 510 and 512. These serve as a resonant transmission line in the UHF frequency range and thereby reflect at the terminals of the forward driven element 14 (FIGURE 9) a relatively high impedance even though the VHF antenna has in fact a relatively low terminal impedance at some part or all of the UHF frequencies. In the VHF band, the UHF antenna acts as a transmission line defined by the conductors 20, FIGURE 9, and in which the UHF driven elements and other parts introduce discontinuities that are not so significant as substantially to impair the antenna operation.

The system of FIGURE 10, may be used without the conductors 510 and 512, in which event there is some additional loading effect by the VHF antenna on the UHF antenna. In many applications, however, this loading effect can be tolerated.

The antenna VHF, FIGURE 10, is shown in illustrative form as a simple folded dipole and reflector. While such a unit may be used in areas of high signal strength, the preferred form of such an antenna is a yagi antenna with director and driven elements arranged to provide a broadband action extending over the entire VHF frequency range.

If desired, the very high frequency antenna VHF, FIGURE 10, may be located behind the ultra high frequency antenna portion. This may be conveniently achieved by mounting both in one boom or by providing booms that may be telescoped together.

The antenna of the present invention is characterized by a plurality of driven elements that are full wave and are quite close to each other. Applicant does not know with certainty why this arrangement is so unusually effective. It is thought that the effectiveness results from the coaction of the various driven elements with each other. This coaction is believed to involve a large number of the driven elements at any one receiving frequency within the UHF television band, and not just one or two of the elements. In any event, the full wave elements and close spacings herein described and claimed have been found to be unusually effective and to provide an antenna construction that is especially desirable.

FIGURE 1*a* shows one end portion of the director 42, FIGURE 1, as constructed in accordance with a further feature of the present invention. As shown, the end of the director is flattened, forming a closure for the interior of the hollow tube. This portion is indicated at 42*a*, FIGURE 1*a*. Inboard the end of the flattened portion (and the director), the flattened end 42*a* has a pair of complementary notches 42*b*. These notches form a portion of reduced cross-section. When desired, the end of the director 42 may be detached at the notches 42*b* by grasping the same between the jaws of a pair of pliers and simply bending back and forth until the metal is cold worked to the breaking point. The break occurs at the line joining the notches 42*b*, so that after this operation the length of the director 42 is determined by the position of the notches. In the preferred form of the invention, each of the directors 38, 40, 42 and 44 has notched ends as illustrated in FIGURE 1*a*. The notches 42*b* on each such end are located inboard the ends of the directors at distances such as to peak the antenna at the high end of the frequency range covered. In one specific construction of the antenna, the director 38 was provided with notches located about one inch inboard the ends of the director, the director 42 was provided with notches about one half inch inboard its ends, director 40 was provided with notches about seven eighths of an inch inboard its ends, and director 44 was provided with notches about one-half an inch inboard its ends. With these directors intact, they provided maximum overall antenna gain in the lower half of the frequency range. If the user desires increased gain in the upper half of the frequency range, he need only break off the ends of the respective directors.

While I have shown and described specific embodiments of the present invention, it will, of course, be understood that many variations and alternative constructions may be made without departing from the true spirit and scope of the invention. The particular construction of the insulating supports, the connections between the driven elements and the transmission line 20—20 (FIGURE 5), the specific dimensions, and other items may be varied to suit the convenience of the maker or user of the antenna. I therefore intend by the appended claims to cover all modifications and alternative constructions that fall within their true spirit and scope.

What I claim as new and desire to secure by Letters Patent of the United States, is:

1. In combination, a television receiving system operable in the range of about 470 to 890 megacycles and defining a pair of terminal conductors having about 300 ohms characteristic impedance;

a pair of parallel conductors defining an open wire transmission line connected to said terminal conductors, respectively;

at least three dipole units connected to said parallel conductors, said dipole units each comprising a pair of substantially coaxial conductors extending along an axis substantially normal to the said parallel conductors and in the plane thereof, the pair of dipole conductors at one end of said pair of parallel conductors being near full wave resonant at substantially the high frequency end of the range, the pair of dipole conductors at the other end of said pair of parallel conductors being close to full wave resonant at substantially the low frequency end of the range, and the pairs of dipole conductors intermediate said end dipole conductors being of progressively varying length between said first pair and said second pair, and spaced along the length of the boom by more than 1.5 inches and less than about three inches;

a reflector of length to provide reflector action at the low frequency end of the band located behind the said pairs of dipole conductors; and, a high band director system located forwardly of the first dipole unit, in the plane thereof, and effective to enhance gain at the high frequency end of the band.

2. A driven element for a wide band antenna operable in the range of about 470 to 890 megacycles to energize a load of about 300 ohms impedance, comprising in combination:

a pair of spaced parallel conductors forming an open wire transmission line;

pairs of conductors located in the plane of said parallel conductors and extending at right angles thereto, the conductors of each pair being substantially coaxial to define a dipole, said pairs of conductors being spaced in the lengthwise direction of said parallel spaced conductors by approximately one-quarter wavelength or less at the high frequency end of the range, the pair of conductors at one end of said transmission line being full wave resonant at substantially the high frequency end of the range, the pair of conductors at the other end of said transmission line being full wave resonant at substantially the low frequency end of the range, and the pairs of conductors intermediate said end pairs of conductors being of progressively varying length; and, a transmission line of substantially 300 ohms characteristic impedance electrically connected to one end of said pairs of spaced parallel conductors.

3. An antenna suitable for reception in the 470 to 890 megacycle television receiving range comprising in combination: .

a boom:

at least three dipole driven elements mounted in substantially coplanar aligned relation straddling the boom, said elements having progressively increased span along the length of the boom and being spaced along the length of the boom by at least 1.5 and not more than three inches, the arms of the shortest dipole being about five inches in length and the arms of the longest dipole being about nine inches in length; and, a pair of conductors spaced parallel with respect to each other, extending along the inboard ends of said driven elements and connected thereto.

4. An antenna suitable for reception in the 470 to 890 megacycle television receiving range comprising in combination:

at least three dipole driven elements mounted in substantially coplanar aligned relation along an axis, said elements having progressively increased span along the length of the axis and being spaced approximately 1.75 inches, the shortest such element being about 12 inches in total span and tuned to the high frequency end of the band and the longest such element being about 19 inches in total span and tuned to the low frequency end of the band, the inboard ends of said elements being spaced about 1.75 inches; and, a pair of conductors parallel to and straddling the axis connecting the inboard ends of said driven elements.

5. An antenna suitable for reception in the 470 to 890 megacycle television receiving range comprising in combination:

at least three dipole driven elements mounted in substantially coplanar aligned relation along an axis, said elements having substantially uniformly progressively increased span along the length of the axis and being spaced by at least 1.5 inches and not more than three inches along the length of the axis, the length of the shortest dipole being such as to give full wave dipole resonance at the high frequency end of the band and the length of the longest dipole being such as to provide full wave dipole resonance at substantially the low frequency end of the band;

a pair of conductors extending along the inboard ends of the dipoles and connected thereto;

a reflector of the length to provide reflector action at the low frequency end of the band located behind the long dipole element; and, a high band director system located forwardly of the short dipole element and effective to enhance gain at the high frequency end of the range.

6. An antenna system suitable for both UHF and VHF television reception comprising in combination:

UHF receiving antenna comprising at least three dipole driven elements mounted in substantially coplanar relation straddling an axis, said elements having progressively increased span along the length of the axis and being spaced by approximately 1.75 inches, the shortest such element being about 12 inches in total span and tuned to the high frequency end of the UHF band and the longest such element being about 19 inches in total span and tuned to the low frequency end of the UHF band, the inboard ends of the said elements being spaced about 1.75 inches, and a pair of conductors parallel to and straddling the axis connecting the inboard ends of the said driven elements;

a VHF receiving antenna;

a transmission line connecting said pair of conductors at one end to the VHF antenna; and, a transmission line connected to said pair of conductors at the other end.

7. An antenna system suitable for both UHF and VHF television reception comprising in combination:

a UHF receiving antenna comprising at least three dipole driven elements mounted in substantially coplanar aligned relation straddling an axis, said elements having progressively increased span along the length of the axis and being spaced by approximately 1.75 inches, the shortest such element being about 12 inches in total span and tuned to the high frequency end of the UHF band and the longest such element being about 19 inches in total span and tuned to the low frequency end of the UHF band, the inboard ends of the said elements being spaced about 1.75 inches, a pair of conductors parallel to and straddling the axis connecting the inboard ends of the said driven elements, and means defining conductors extending from the end at which said shortest dipole driven elements are positioned and of about 7 inches in length;

a VHF receiving antenna;

a transmission line connecting said last mentioned conductors intermediate their length to the VHF antenna; and, a transmission line connected to said pair of parallel conductors at the end at which said longest dipole driven elements are connected.

8. An antenna suitable for coverage of the 470 to 890 megacycle band and exhibiting substantially uniform impedance and gain characteristics across the entire operating frequency range, comprising in combination:

at least three dipole driven elements mounted in substantially coplanar aligned relation along an axis, said elements having progressively increased span along the length of said axis, the shortest such element being of a length for providing substantially full wave resonance at the high end of the band and the longest such element being of a length for providing substantially full wave resonance at the low end of the band;

a pair of parallel conductors straddling said axis, said conductors interconnecting the inboard ends of said dipole driven elements on respective sides of said axis; and said dipole driven elements being substantially uniformly spaced from one another along said axis within the range of approximately 1.5 to 3 inches so as to provide substantially 300 ohm characteristic impedance across the entire band as measured from the inboard ends of the dipole driven elements at one end thereof.

9. An antenna in accordance with claim 8 wherein twenty-one dipole driven elements of progressively increasing span along said length of said axis are electrically interconnected at their inboard ends by said pair of parallel spaced conductors.

References Cited

UNITED STATES PATENTS

| | | | |
|---|---|---|---|
| 2,192,532 | 3/1940 | Katzin | 343—811 |
| 2,817,085 | 12/1957 | Schwartz et al. | 343—814 |
| 3,050,730 | 8/1962 | Lamberty | 343—908 X |
| 3,259,904 | 7/1966 | Blonder et al. | 343—814 |

ELI LIEBERMAN, *Primary Examiner.*